United States Patent
Sistonen

[11] Patent Number: 6,105,602
[45] Date of Patent: *Aug. 22, 2000

[54] FUEL STATION AND METHOD FOR ASSEMBLING OF THE SAME

[75] Inventor: Jari Sistonen, Joroinen, Finland

[73] Assignee: Oy U-Cont Ltd., Jorinen, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/522,308

[22] PCT Filed: Dec. 30, 1993

[86] PCT No.: PCT/FI93/00570

§ 371 Date: Oct. 13, 1995

§ 102(e) Date: Oct. 13, 1995

[87] PCT Pub. No.: WO94/20341

PCT Pub. Date: Sep. 15, 1994

[30] Foreign Application Priority Data

Mar. 5, 1993 [FI] Finland ..................................... 930982

[51] Int. Cl.[7] ...................................................... B60S 5/02
[52] U.S. Cl. .......................................... 137/234.6; 52/294
[58] Field of Search ............................. 137/234.6; 52/294

[56] References Cited

U.S. PATENT DOCUMENTS

| | | | |
|---|---|---|---|
| 2,182,126 | 12/1939 | Hogarth | 137/234.6 X |
| 2,959,826 | 11/1960 | Larsen et al. | 137/234.6 X |
| 3,395,723 | 8/1968 | Tatsuno | 137/234.6 X |
| 3,774,723 | 11/1973 | Johnston | 137/234.6 X |
| 4,383,521 | 5/1983 | Bounds | 52/294 X |
| 4,524,553 | 6/1985 | Gregory | 52/294 X |
| 4,694,625 | 9/1987 | Gregory | 52/294 |
| 4,754,588 | 7/1988 | Gregory | 52/294 |
| 4,901,748 | 2/1990 | Shotmeyer | 137/234.6 |
| 4,926,899 | 5/1990 | Argandona | 137/234.6 X |
| 5,114,046 | 5/1992 | Bryant | 137/234.6 X |

FOREIGN PATENT DOCUMENTS 1201400 12/1959 France ................................. 137/234.6

*Primary Examiner*—John Rivell
*Attorney, Agent, or Firm*—Knobbe, Martens, Olson & Bear, LLP

[57] ABSTRACT

A fuel dispensing station having at least one underground tank, a pump island including at least one fuel pump for dispensing the fuel contained in the tank, and a pump roofing. The fuel dispensing station is provided with a common foundation wherein, directly or indirectly, the fuel tank or tanks, and other necessary tanks, the pump island, and pump roofing are all connected to each other as an integral unit. The dispensing station is adapted to be transported to an installation site as readily erectable blocks.

16 Claims, 2 Drawing Sheets

FUEL STATION AND METHOD FOR ASSEMBLING OF THE SAME

FIELD OF THE INVENTION

The present invention relates to a fuel dispensing station, comprising at least one underground fuel tank a pump island including at least one fuel pump for dispensing the fuel contained in said tank, as well as a pump roofing.

BACKGROUND OF THE INVENTION

The erection of a fuel dispensing station usually requires the construction of separate foundations. The fuel tank, pump island, and pump roofing are usually each provided with their own foundation. The construction of foundations and the provision of various electrical, data transfer, fuel, gas, water and sewage connections between the various elements at the construction site requires a lot of time and costs.

SUMMARY OF THE INVENTION

In order to eliminate these drawbacks, the arrangement of the invention is such and a fuel dispensing station of the invention is characterized in that the fuel tank and other possibly necessary tanks, the pump island and pump roofing are assembled together as an integral unit provided with a common foundation.

One preferred embodiment of the invention is arranged such that the dispensing station is adapted to be carried to an installation site as readily erectable blocks.

When using a solution of the invention, all structures can be nearly finished at a factory with only earthmoving operations and simple erecting and coupling operations required at the construction site.

The invention further relates to a method as set forth in the preamble of claim 6, characterized in that the dispensing station is carried to an installation site as readily erectable blocks and that the fuel tank, and other possible necessary tanks, the pump island and pump roofing are assembled together at the installation site as an integral unit provided with a common foundation.

Some preferred further developments of the invention are disclosed in the subclaims.

The invention will now be described in more detail with reference mode to the accompanying drawing, in which:

DESCRIPTION OF THE PREFERRED EMBODIMENTS

Figure 1:
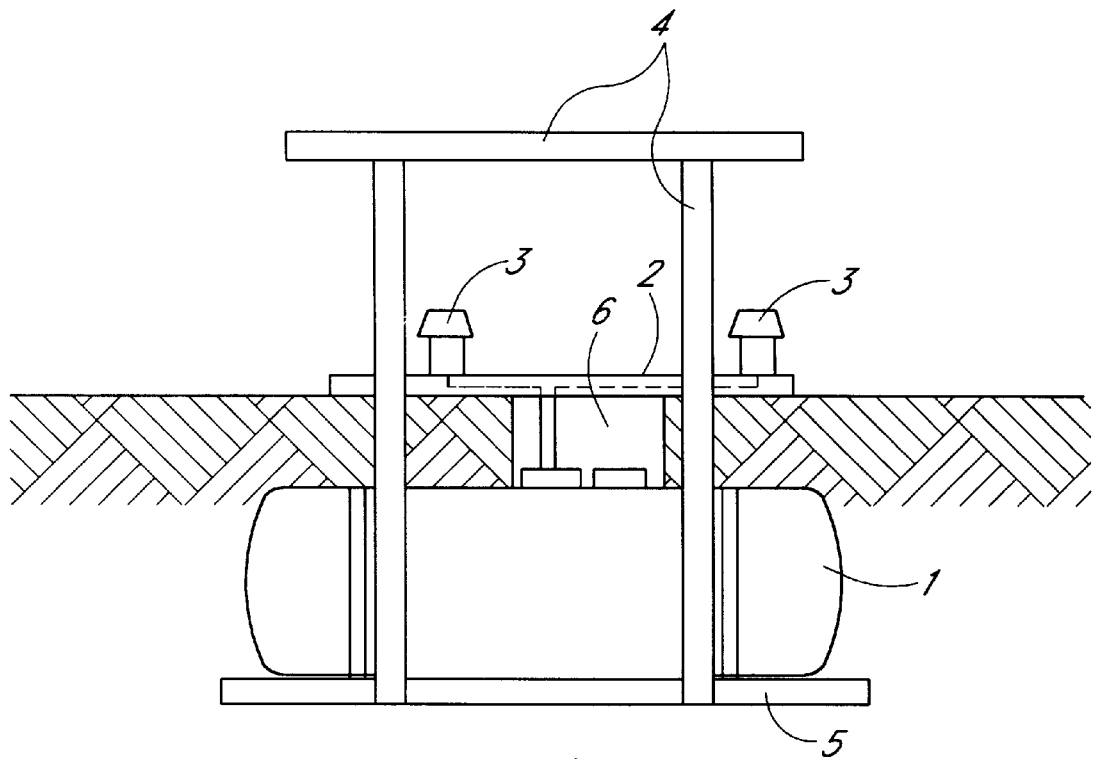
FIG. 1 is a partially sectional side view of a dispensing station of the invention.
Figure 2:
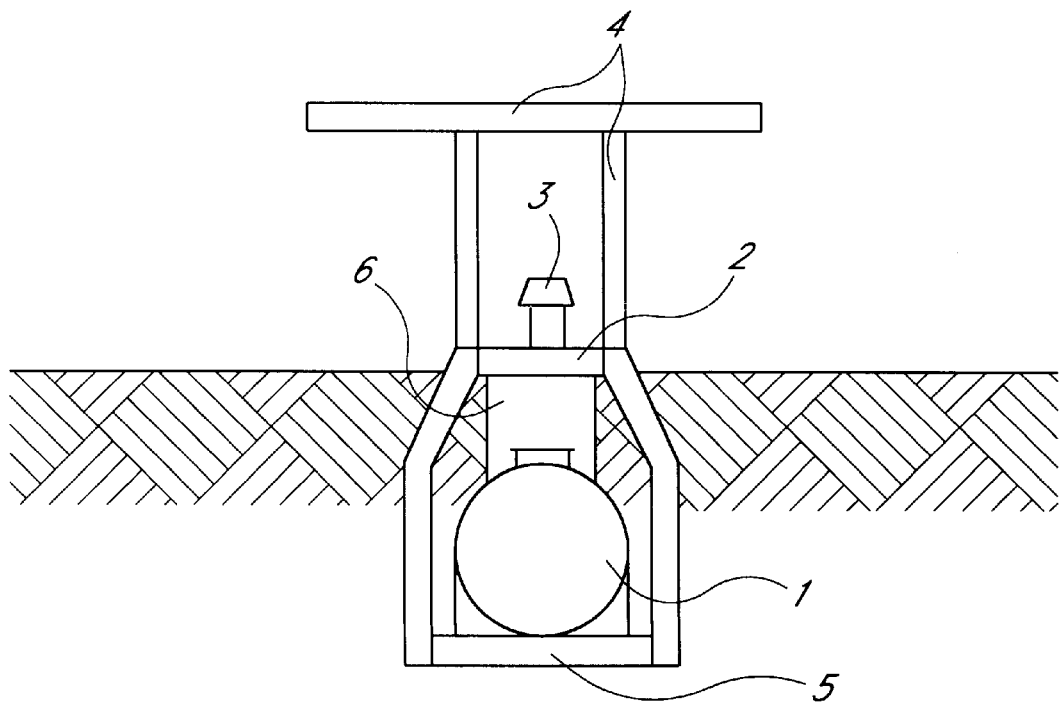
FIG. 2 is a partially sectional end view of a dispensing station of the invention.

A fuel dispensing station, an example of which is schematically shown in FIGS. 1 and 2 and installed in position and buried partially underground, includes a fully underground fuel tank 1, a pump island 2, laid substantially on ground level or slightly thereabove and provided with two fuel pumps 3, as well as a pump roofing 4 serving as a rain shelter for refuellers. In addition to the fuel tank 1, the number of which may be more than one, other necessary tanks may be included as well.

In the example shown in FIGS. 1 and 2, a foundation 5 comprises a reinforced concrete slab, which is laid or cast in a desired depth as required by the surrounding soil. All elements included in a dispensing station of the invention are directly or indirectly supported on the foundation 5, whereby the fuel tank 1, pump island 2 and pump roofing 4 are connected together as an integral unit provided with this common foundation 5.

The fuel tank 1 and frame structures for the pump roofing 4 are supported on top of the foundation 5 as known in the art. The pump island 2 is in turn secured to the frame structures of pump roofing 4 and further on top of the fuel tank 1 through the intermediary of the wall structure of an inspection well 6 for tank 1 in such a manner that most of the bearing loads of the roofing 4 are directed to the foundation 5 rather than the fuel tank 1. As can be seen in the drawings, particularly FIGS. 1 and 2, the frame structures are relatively massive compared with the inspection well 6 and direct bearing loads of the roofing past the fuel tank 1. The pump island 2 is provided with an openable gate for the access into the inspection well 6.

The mass of all structures included in a dispensing station are thus utilized for anchoring the tank 1 against the buoyancy caused by ground-water.

The dispensing station is adapted to be carried to an installation site as readily erectable block. All operations requiring precision and high skill are performed at the factory and, thus, the construction site only involves eathmoving operations and assembling the blocks together as well as necessary simple coupling operations.

In view of minimizing the costs the frame structures of pump roofing 4 and pump island 2, preferably consisting of tubular girders, are used as fuel, gas and drain pipes, such as to sewers or as to protective pipes therefor.

Foundation 5 can be provided in several ways. In addition to a slab transported to the site or a slab to be cast on site, which would with its necessary reinforcements may be included in the frame structure of a station, the foundation can be produced e.g. in a manner such that the outer wall of the fuel tank provides an anchorage, foundation and runoff basin.

Figure 3:
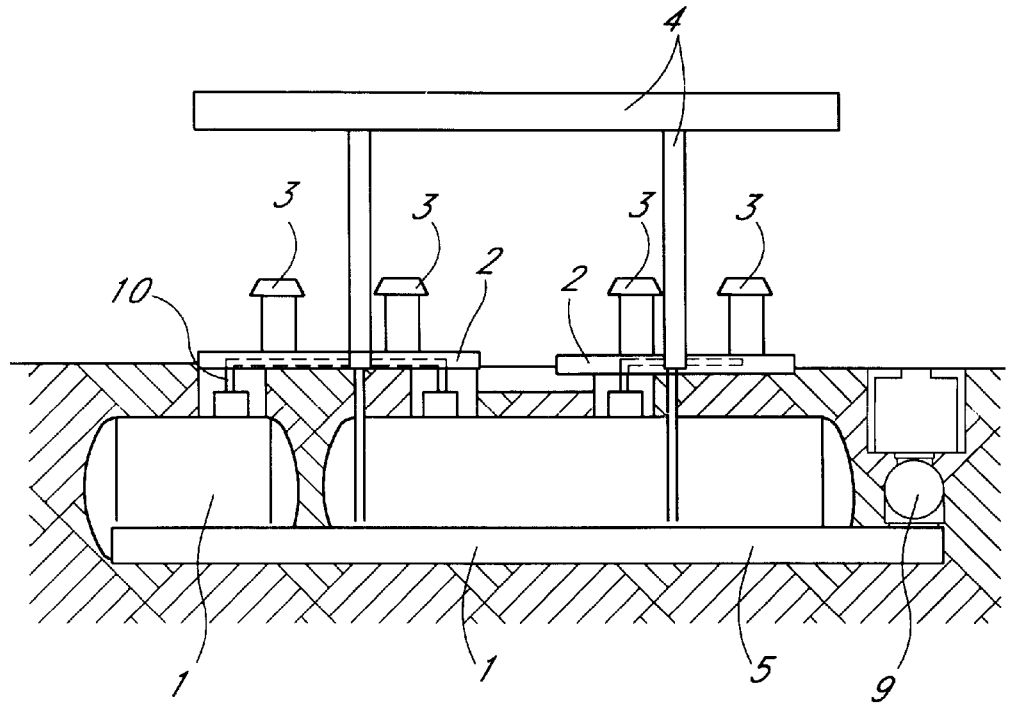
FIGS. 3 and 4 are views equivalent to FIGS. 1 and 2, showing a second preferred embodiment for a dispensing station.
Figure 4:
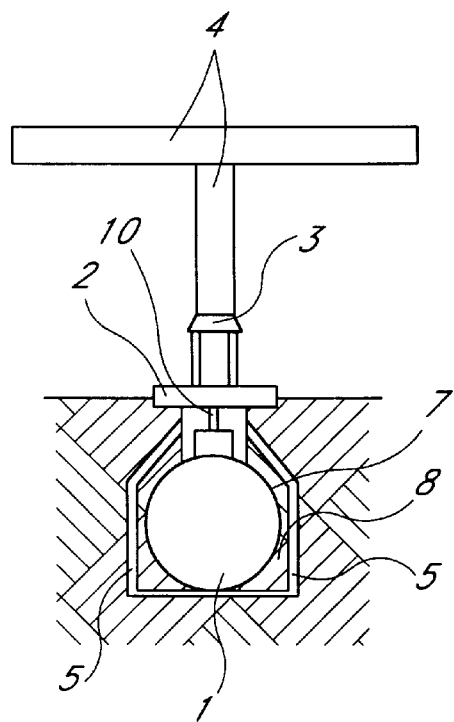

FIGS. 3 and 4 illustrate one particularly preferred embodiment for a dispensing station of the invention. The components equivalent to those in FIGS. 1 and 2 are indicated by the same reference numerals.

In this example, a foundation 5 is provided by using two elongated, spaced-apart reinforced beams, the frame structures of a pump roofing 4 being supported upon said beams in a per se known fashion. Also pump islands 2 along with pumps 3 as well as all tanks 1 and all other tanks and equipment included in a station are indirectly or directly supported upon said reinforced beams 5. Tanks 1 are fastened with suitable ties 7, 8 to the pump roofing frame structures.

In a finished dispensing station, the entire mass of a station rests upon the beams providing the foundation 5 and, thus, even when the tanks are empty, the buoyancy is not capable of dislodging the tanks. Since the entire load is exclusively concentrated on foundation 5, the latter can thus be provided by means of structures that are very simple and as light as possible. This is important in view of transportability.

The solution shown in FIGS. 3 and 4 is intended to be carried to its site in a manner such that the pump islands 2 and the elements therebelow, including fuel pumps 1 and other equipment, e.g. an oil separation tank with its maintenance shaft 9, are intended to be transported as a completely finished block to be lowered into a previously excavated and flat-bottomed pit. Once said block has been set in position and connected to the electric and communication mains, the pit is filled and pakced with gravel. This is followed by erecting the pump roofing 4 and setting up the fuel pumps 3 and the like. All block components are pre-assembled at the factory. Thus, no precision demanding procedures need be performed at the actual erection site.

In a preferred embodiment of the invention, all components having anything to do with fuel are provided with a double wall for minimizing the environmental contamination hazard. The practical arrangement for this is that the tanks are provided with double walls and all fuel pipes 10 are adapted to extend within the inspection well 6 and inside the pump island 2.

What is claimed is:

1. A fuel dispensing station, comprising:
    at least one fuel tank having a top and at least two opposing sides and adapted to be located underground;
    a pump island including at least one fuel pump for dispensing fuel;
    roofing;
    a frame structure;
    a foundation for said fuel-dispensing station;
    such that said fuel tank, the pump island and roofing are adapted to be connected to each other as an integral unit, and the dispensing station is adapted to be transported to an installation site as readily erectable blocks,
    wherein when connected to each other, the foundation is located to support the fuel tank, the frame structure supports the roofing above the pump island and comprises posts spaced apart and extending from the pump island downwardly past the top of the fuel tank to the foundation on said opposing sides of the fuel tank to engage the foundation to form a framework around said fuel tank so that the foundation supports the frame structure so as to direct most of the bearing loads of the roofing to the foundation rather than the fuel tank.

2. A dispensing station as set forth in claim 1, wherein the frame structures of the pump roofing and pump island are used as fuel, gas and draining pipes.

3. A dispensing station as set forth in claim 1, wherein said foundation is provided at the installation site.

4. A dispensing station as set forth in claim 1, further comprising an inspection well between the pump island the fuel tank, said inspection well being fixedly connected to the pump island.

5. A dispensing station as set forth in claim 4, wherein fuel pipes are adapted to extend within the inspection well and inside the pump island for providing a double-walled design for the fuel pipes.

6. A dispensing station as set forth in claim 2, wherein fuel pipes are adapted to extend within the inspection well and inside the pump island for providing a double-walled design for the fuel pipes.

7. A method for erecting a fuel dispensing station, said station comprising at least one fuel tank having a top, and at least two opposing sides, a pump island including at least one fuel pump for dispensing fuel from said tank and roofing supported above said pump island by a frame structure, wherein the method comprises the steps of:
    carrying the dispensing station to an installation site as readily erectable blocks,
    erecting a foundation within an excavated pit,
    connecting the erectable blocks together at the installation site into an integral unit supported by said foundation,
    supporting the fame structure of the roofing on the foundation, said frame structure comprising posts spaced apart and extending from the pump island so that the frame structure downwardly past the top of the fuel tank on said opposing sides of the fuel tank to engage the foundation so as to direct most of the bearing loads of the roofing to the foundation rather than the fuel tank.

8. A dispensing station as set forth in claim 7, further comprising an inspection well between the pump island and the fuel tank, said inspection well being fixedly connected to the pump island.

9. A dispensing station as set forth in claim 8, wherein the frame structures of the pump roofing and pump island are used as fuel, gas and drain pipes.

10. A dispensing station as set forth in claim 9, wherein fuel pipes are adapted to extend within the inspection well and inside the pump island for providing a double-walled design for the fuel pipes.

11. A fuel dispensing station in the form of a kit of parts, comprising:
    at least one fuel tank to be placed underground said tank having opposing sides extending substantially parallel to the longitudinal axis of said tank;
    a pump island comprising at least one fuel pump; and
    roofing and a frame structure for supporting said roofing above said pump island, wherein said kit is adapted to be installed on a common foundation, and wherein said frame structure is adapted to be supported on the foundation so as to direct most of the bearing loads of the pump roofing to the foundation rather than the fuel tank, said frame structure comprising posts spaced apart and extending from the pump island downwardly past the top of the fuel tank to the foundation on said opposing sides of the fuel tank to engage the foundation, and a plurality of beams comprising said foundation for placement on said sides of said fuel tank to extend substantially parallel to said longitudinal axis and support said fuel tank.

12. A fuel dispensing station, comprising:
    a roof;
    a pump island having at least one fuel pump mounted thereon;
    a frame for supporting said roof above the pump island;
    a fuel tank buried underneath said pump island said tank having at least two opposing sides; and
    a buried foundation wherein said fuel tank and said frame are supported by said foundation, said foundation comprising a pair of beams extending on opposing sides of said fuel tank said frame further comprising posits spaced apart and extending from the pump island downwardly past the top of the fuel tank to the foundation on said opposing sides of the fuel tank to engage the foundation so that the foundation supports the frame structure so as to direct most of the bearing loads of the roofing to the foundation rather than the fuel tank.

13. A fuel dispensing station, comprising:
    at least one fuel tank having at least two opposing sides and adapted to be located underground;

a pump island, including at least one fuel pump for dispensing fuel;

roofing;

a frame structure;

a foundation for said fuel dispensing station said foundation being in the form of a discrete slab;

such that said fuel tank, the pump island and roofing are adapted to be connected to each other as a integral unit, and the dispensing station is adapted to be transported to an installation site as readily erectable blocks, wherein when connected to each other, all the foundation is substantially underneath the fuel tank to support the fuel tank, the frame structure supports the roofing above the pump island and is connected to the foundation and comprises posts spaced apart and extending from the pump island downwardly past the top of the fuel tank to the foundation on said opposing sides of the fuel tank to engage the foundation so that the foundation supports the frame structure so as to direct most of bearing loads of the roofing past the fuel tank to the foundation.

14. A method for erecting a fuel dispensing station, said station comprising at least one fuel tank having a top and at least two opposing sides, a pump island including at least one fuel pump for dispensing fuel, and roofing supported above said pump island by a frame structure, wherein the method comprises the steps of:

carrying the dispensing station to an installation site as readily erectable blocks, erecting a foundation within an excavated pit, connecting the erectable blocks together at the installation site into an integral unit supported by said foundation, comprising placing said fuel tank in said pit on said foundation to support said fuel tank, packing filing material against said fuel tank, supporting the frame structure of the roofing on the foundation said frame structure further comprising posts spaced apart and extending from the pump island downwardly past the top of the fuel tank to the foundation on said opposing sides of the fuel tank to engage the foundation so as to direct most of the bearing loads from the roofing to the foundation rather than the fuel tank, and supporting the fuel tank with said foundation.

15. A kit for constructing a fuel dispensing station, comprising:

a roof;

a first unit adapted to be transported as a single block, comprising a generally planar foundation, a pump island, a first frame portion and a fuel tank, said foundation defining an upper surface above which said fuel tank is fixed, said first frame portion extending from said upper surface of said foundation to said pump island to support and space said pump island above said foundation and said fuel tank;

a second frame portion extending from said pump island to said roof to support and space said roof above said pump island, said first frame portion extending from foundation to said pump island so as to direct most of the bearing loads of the roof to the foundation rather than the tank.

16. A fuel dispensing station, comprising:

a foundation defining a location sized and shaped to receive a fuel tank;

a fuel tank fixed to said foundation and positioned in said location;

a first pair of frame members positioned to one side of said fuel tank defining a substantially open first side;

a second pair of frame members positioned to another side of said fuel tank defining a substantially open second side, wherein said foundation and said frame members cooperate to define a first open end and a second open end;

a pump island supported and spaced from said foundation by at least one of said first pair of frame members and at least one of said second pair of frame members;

a roof supported and spaced from said pump island by said first pair of frame members and said second pair of frame members, said members directing most of the bearing loads of the roof to the foundation rather than the tank.

* * * * *